United States Patent [19]

Morrow, Jr.

[11] 4,122,428
[45] Oct. 24, 1978

[54] MARINE DETECTION APPARATUS

[76] Inventor: Ray E. Morrow, Jr., 1210 Rafael St., Salem, Oreg. 97303

[21] Appl. No.: 743,590

[22] Filed: Nov. 22, 1976

[51] Int. Cl.$^2$ .......................... G01S 9/70; G01S 7/56; G01K 1/02; G01K 7/24
[52] U.S. Cl. .................................... 340/3 C; 340/1 C; 73/344; 73/362 AR
[58] Field of Search .................. 340/3 C, 3 T, 1 C; 73/344, 345, 362 AR

[56] References Cited

U.S. PATENT DOCUMENTS

| | | | |
|---|---|---|---|
| 3,253,466 | 5/1966 | Chough | 73/344 X |
| 3,267,413 | 8/1966 | Beebe et al. | 340/3 C X |
| 3,307,143 | 2/1967 | Wyse et al. | 340/1 C X |
| 3,673,552 | 6/1972 | Mross et al. | 340/3 T X |
| 3,878,502 | 4/1975 | Rochelle | 340/5 R |

*Primary Examiner*—Richard A. Farley
*Attorney, Agent, or Firm*—Klarquist, Sparkman, Campbell, Leigh, Hall & Whinston

[57] ABSTRACT

Marine detection apparatus includes a sound transducer mounted below the water line of a vessel for emitting and receiving sound signals and imperviously sealed within a transducer housing together with a temperature detector for sensing the temperature of the water. A display is provided capable of displaying water depth and water temperature. The water depth reading is proportional to the elapsed time between the transmission and the reception of the sound waves, and the temperature reading is proportional to an elapsed time determined by a timing circuit in which the resistance value of the temperature sensor operates to determine the charging time of a capacitor. The display is of a circular, dial type using lighted spots and a lighted arcuate shaped column to display the depth and temperature.

4 Claims, 4 Drawing Figures

MARINE DETECTION APPARATUS

BACKGROUND OF THE INVENTION

The subject matter of the present invention relates generally to marine detection apparatus and in particular to water depth and water temperature detection apparatus for a vessel.

In the operation of the ship or boat, several parameters regarding the body of water on which the vessel is located are useful and cannot be determined visually. For example, useful information for fishermen includes depth soundings for locating schools of fish, as well as the temperature of the water. It is well known, for instance, that certain types of fish are generally found only in water having a given temperature range, such as a warmer current in a colder body of water, or are apt to feed in waters having a given temperature range. Heretofore, depth and temperature measurements have been made separately, and although electronically operated devices are available for depth sounding, temperature measurements are frequently made employing relatively cumbersome thermometer devices.

It is therefore one object of the present invention to provide an improved marine detection apparatus of the water depth and water temperature detection type.

Another object of the invention is to provide an improved marine detection apparatus wherein both water depth and water temperature may be alternatively displayed upon the same master display.

An additional object of the present invention is to provide an improved means for measuring and displaying temperature.

SUMMARY OF THE INVENTION

In accordance with the present invention, a temperature detecting means includes a timing device for producing a display, wherein the duration of output of such timing device is dependent upon a temperature sensitive means. In one embodiment, the display comprises a rotating disc which initiates operation of the timing device at one rotational position of the disc, said disc then registering, by its rotational movement, the time duration of output from said timing device. The appearance of the display is similar to an arcuate shaped column of mercury. In another embodiment, display means includes a counter whose operation is initiated coincidentally with turn-on of the timing device, and wherein counting is concluded when such timing device times out.

In a particular embodiment, apparatus according to the present invention includes a transducer housing in which are imperviously sealed or potted a sound transducer for emitting and receiving sound signals and a thermistor for sensing water temperature. A master display is provided consisting of a lamp mounted upon a constantly rotating disc illuminated at various predetermined portions of its 360° rotation cycle. The illumination times are determined by transmitter and receiver operation when the apparatus is in the water depth display mode, and are determined by the water temperature, when the apparatus is in the temperature display mode. The thermistor forms an integral part of an RC timing circuit which brings about illumination of the lamp for a portion of its arcuate rotation, the duration of illumination being determined by the thermistor's resistance value.

The subject matter regarded as my invention is claimed at the conclusion of this specification. However, the invention may best be understood by reference to the following description and drawings.

DRAWINGS

DETAILED DESCRIPTION

Figure 1:
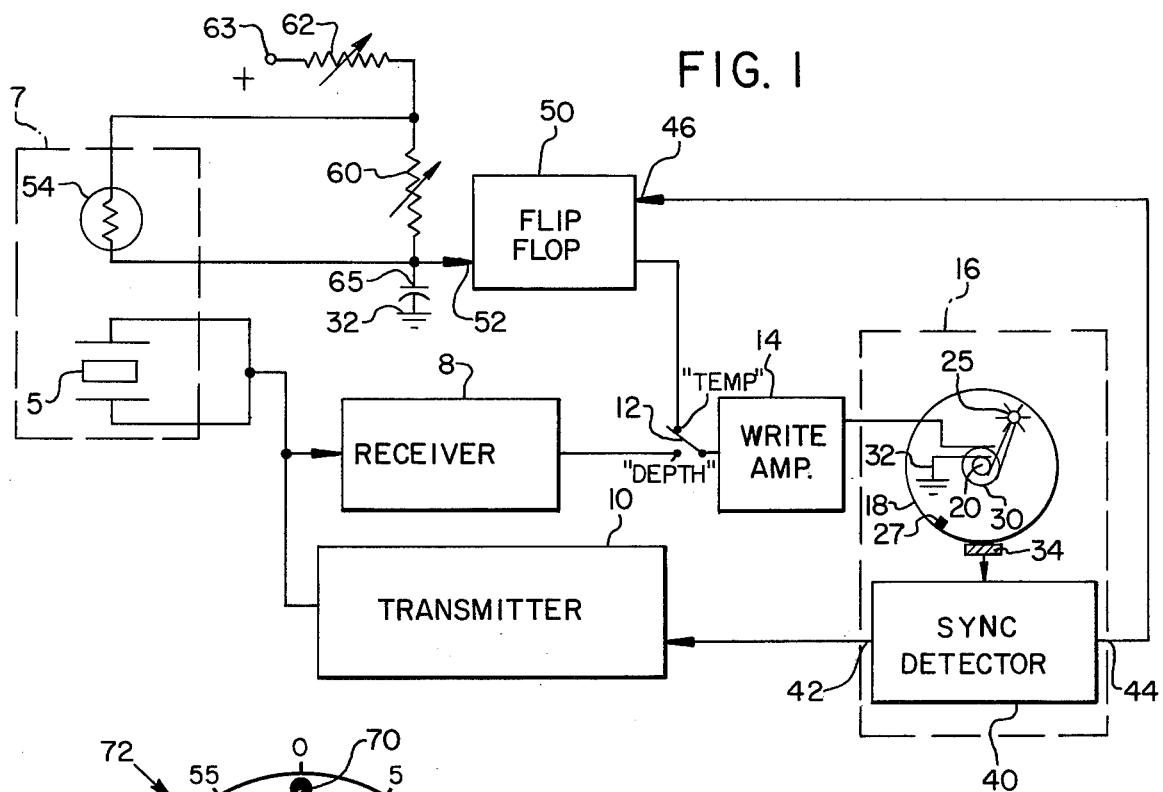
FIG. 1 is a schematic block diagram of a depth sounding and temperature display apparatus according to the present invention.

Referring now to the drawings, and initially to FIG. 1, there is depicted in block diagram form an embodiment of a depth sounding and temperature indicating apparatus in accordance with the present invention. Depth sounding apparatus comprises a sound emitting and receiving transducer 5 encased in a transducer housing 7 and electrically connected to the input terminal of a receiver 8 and the output terminal of transmitter 10. The transducer housing 7, encapsulating therewithin the transducer 5 and thermistor 54, is mounted on a vessel below the water line thereof and is of such construction as to be impervious to water. The output terminal of the receiver 8 may be electrically connected through function switch 12 to the input terminal of write amplifier 14. Transducer 5, receiver 8 and transmitter 10 are of a type well known in the art and function in combination so as to alternatively transform electrical signals into sound waves, transmit the sound waves through a liquid medium, and subsequently detect reflections of the sound waves and transform them into electrical signals.

Write amplifier 14 increases the signal strength received from receiver 8 enabling the signal to be utilized as hereinafter described. The output of the write amplifier 14 and the input of the transmitter 10 are connected to scanner 16. Such scanner 16 is comprised of a scanner disc 18 rotatably mounted about an axis 20 and having a light 25 and permanent magnet 27 rigidly mounted thereon and having a pair of slip rings 30 concentrically and rigidly mounted thereto for connection to light 25. One slip ring may be connected via a brush to the output terminal of write amplifier 14 and the other slip ring may be connected via another brush to circuit ground 32 as shown in FIG. 1.

Scanner disc 18 may be formed of an insulating material or may be formed of a conductive material having the light 25, permanent magnet 27 and slip rings 30 insulated therefrom. The scanner disc is rotated at constant speed by a suitable electric motor (not shown), thereby causing permanent magnet 27 to pass in close proximity to a magnetic pickup 34 once for every rotation of scanner disc 18. The magnetic pickup 24 is electrically connected to the input terminal of sync detector 40.

The combination of magnetic pickup 34 and sync detector 40 operate to cause an electrical pulse to be generated at two sync output terminals 42 and 44 of the sync detector whenever permanent magnet 27 passes in close proximity to magnetic pickup 34, i.e., once for every rotation of scanner disc 18. Sync output terminal 42 of detector 40 is electrically connected to the input terminal of transmitter 10 for triggering the transmitter to transmit an electrical signal to the transducer 5 for thereupon generating a sound wave in the water.

Different arrangements may be used for generating an input for sync detector 40 in place of the combination of permanent magnet 27 and magnetic pickup 34. For example, a lamp may be used to replace the permanent magnet and a photocell may be used to replace the magnetic pickup for accomplishing the identical result in a substantially identical manner.

Sync output terminal 44 of sync detector 40 is electrically connected to first input terminal 46 of switching flip-flop circuit 50. The flip-flop comprises a monostable multivibrator and generates an output pulse, in response to a sync detector output pulse. The duration of the output pulse is determined by the voltage level appearing at second "input" terminal 52 of the flip-flop circuit 50. This voltage level, in turn, is controlled by thermistor 54. Thermistor 54 as well a resistors 60,62 and capacitor 65 form a time constant circuit for determining the unstable period of flip-flop 50.

Temperature sensitive thermistor 54 is imperviously sealed or "potted" into the transducer housing 7 along with transducer 5, the thermistor having its output terminals connected across spread resistor 60. One terminal of the spread resistor is connected through lower limit resistor 62 to a suitable positive voltage source terminal 63, and the other terminal is connected through capacitor 65 to circuit ground 32. It will be seen that capacitor 65 is allowed to charge through the combination of lower limit resistor 62, thermistor 54 and spread resistor 60 from the positive voltage source. When the capacitor charges to a predetermined voltage, the unstable "on" time of the flip-flop is concluded.

The range of possible resistance values that the parallel combination of resistances 54 and 60 may exhibit, with changes in the resistance of the thermistor, may be operably adjusted by spread resistor 60. Thus, adjusting spread resistor 60 to a given value will adjust the range of possible charging times for capacitor 65 in response to variations in thermistor resistance.

The lower limit resistor 62 is likewise a resistor whose value is operably adjustable, and this resistor is connected in series with the parallel combination of thermistor 54 and spread resistor 60. Adjusting the lower limit resistor to a suitable value will set a "lower limit" on the resistance value of the combination, and therefore the lower limit on the charging time of capacitor 65. Thus, resistors 60 and 62 are adjustable to calibrate the instrument.

Thermistor 54 is a type well known in the art, the resistance of which changes inversely with the ambient termperature of its environment. It will be seen that as the ambient temperature increases, capacitor 65 will charge more rapidly causing the output pulse of the flip-flop to be of a longer duration. The output terminal of the flip-flop is electrically connected through function switch 12 to the input terminal of write amplifier 14.

Figure 2:
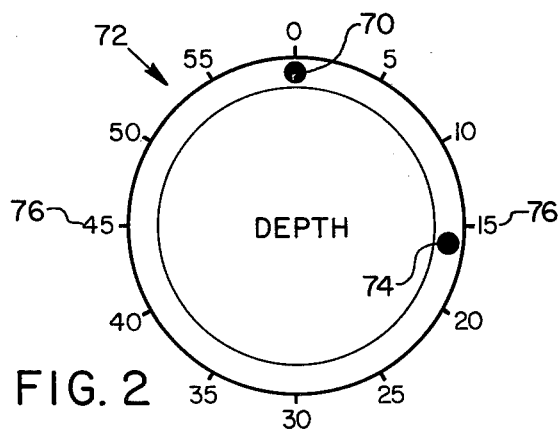
FIG. 2 is a schematic view of a master display utilized as a water depth display in the present invention.

It will be seen that the light 25 will be illuminated whenever an output voltage appears at the output terminal of write amplifier 14. When function switch 12 is in the "Depth" position, receiver 8 is connected to write amplifier 14. As permanent magnet 27 passes in close proximity to magnetic pickup 34, an output pulse is generated by sync detector 40, thereby causing an electrical pulse to be transmitted by transmitter 10 which concurrently causes transducer 5 to emit sound waves into the water and receiver 8 to output a signal through function switch 12 to write amplifier 14 thereby illuminating lamp 25 for the duration of the output pulse from transmitter 10. This situation may occur when light 25 is in the vertical position, as shown by lighted spot 70 on the face of master display 72 in FIG. 2. Light 25 is de-energized at the termination of the output pulse from transmitter 10, and scanner disc 18 continues to turn until transducer 5 receives a reflection of the transmitted soundwaves. The reflection is transformed into an electrical signal by the transducer and sent to receiver 8 which again sends an output pulse through function switch 12 to write amplifier 14 causing light 25 again to be illuminated in another and different angular position about axis 20. This is illustrated as a second lighted spot 74 on the face of master display 72, providing a water depth indication in FIG. 2. The instrument thus may be used to read the depth of water, under a vessel, by reading the second lighted spot 74 upon the dial face wherein the outer perimeter of the dial face is calibrated in convenient depth values 76, e.g., feet, yards, or fathoms. In the example, disc 18 turns in a clockwise manner.

Figure 3:
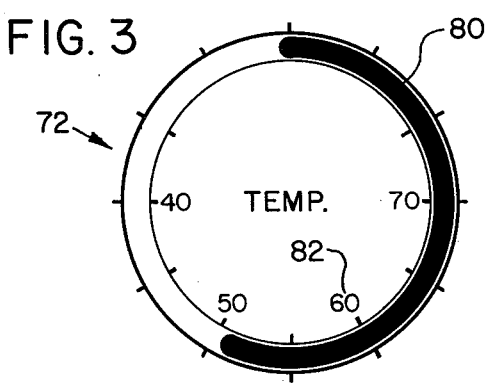
FIG. 3 is a schematic diagram of a master display utilized as a water temperature display in the present invention.

When function switch 12 is in the "Temp" position, the input to write amplifier 14 is derived from the output of flip-flop 50. As permanent magnet 27 passes in close proximity to magnetic pickup 34 an output pulse is generated at the input terminal of sync detector 40, triggering an output pulse at output terminal 44 of sync detector 40. An output pulse appears, at the output terminal of flip-flop 50, of a duration inversely dependent upon the ambient water temperature, as hereinbefore described. This output pulse is coupled to write amplifier 14 for illuminating lamp 25 for the duration of the output pulse. It will be seen that lamp 25 will be energized from a point in time when it is in the vertical position until a later point in time when it reaches a different position determined by the ambient water temperature. This provides a lighted arc shaped column 80 on the face of master display 72, such display being utilized as a water temperature display in FIG. 3. Since the length of lighted arc 80 is inversely proportional to the ambient water temperature, the inner perimeter of the dial face of the master display in FIG. 3 may be calibrated with numerals 82 in a manner such that the correct water temperature is shown. The resistances 60 and 62 are adjusted for calibration purposes as hereinbefore mentioned. Again, disc 18 rotates in a clockwise direction.

Figure 4:
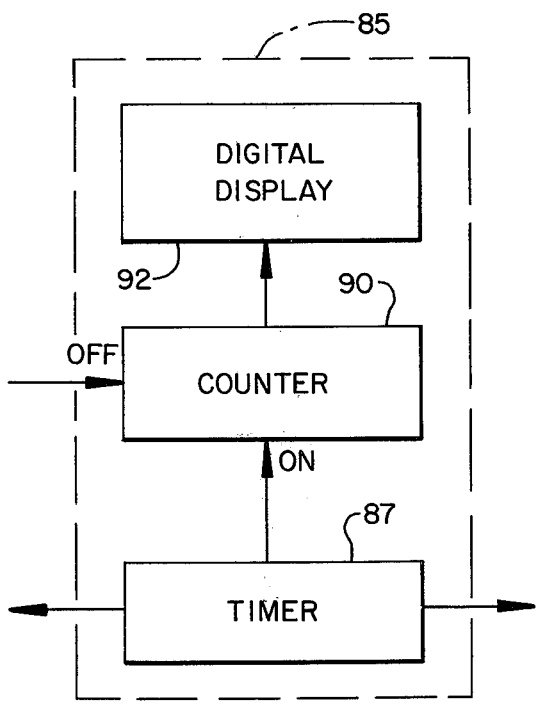
FIG. 4 is a schematic diagram of an alternate master display for displaying either water temperature or water depth according to the present invention.

FIG. 4 illustrates an alternative master display 85 for displaying water temperature and water depth. The alternative master display 85 can replace scanner 16 in FIG. 1 with the output terminals of timer 87 being substituted for output terminals 42 and 44 of sync detector 40, and the "off" terminal of counter 90 substituted for the input terminal of scanner disc 18. Timer 87 causes output pulses to appear at its two output terminals and its "on" terminal at periodic and regular intervals. The "on" terminal of timer 87 is connected to counter 90 allowing the counter to count for a length of time determined by the voltage level appearing at the "off" terminal of counter 90. Thus, the counter is caused to count until a return pulse is received via receiver 8, or alternatively when flip-flop 50 has timed out. The output terminal of counter 90 is electrically connected to the input terminal of digital display 92 which displays the accumulated count in counter 90 whenever the counter is caused to turn off. It will be understood that timer 87, counter 90, and digital display 92 may be of a type well known in the art and operate in a manner substantially identical to the embodiment hereinbefore described. However, instead of a second lighted spot 74 (FIG. 2), or lighted arc 80 (FIG. 3), being utilized to display water depth or water temperature, the water depth and water temperature are alternatively displayed by digital display 92, depending upon the position of function switch 12.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Marine detection apparatus comprising:
    transducer means including a sound emitting and a receiving means and temperature sensitive means for mounting on a vessel under the water line thereof,
    a sound transmitter and receiver coupled to said transducer means for alternately causing the emission of sound waves in response to transmitter operation and detection of sound waves by said receiver,
    display means with which the operation of said transmitter is synchronized and for receiving the output of said receiver for displaying a depth reading in accordance with the elapsed time between transmission and reception of sound via said transducer means, said display means comprising a rotatable scanner having a light source mounted thereupon which is selectively illuminated in response to the output of said receiver, said scanner being provided with positional detector means for synchronizing operation of said transmitter,
    a switching device including an R-C time constant circuit for determining the duration of the device's output, said time constant circuit including said temperature sensitive means, so that said switching device has an output with a duration indicative of the temperature measured by said temperature sensitive means,
    means for synchronizing the operation of said switching device with rotation of said scanner in response to said positional detector means to initiate operation of said switching device for the production of an output when said light source is in a given rotational position,
    and means for selectively causing energization of said light source in response to the output of said switching device, causing said light source to maintain an on-condition and produce an arcuate column of light over a predetermined portion of its cycle of rotation in accordance with the duration of output of said switching device which in turn is responsive to the time constant thereof as affected by said temperature sensitive means.

2. The apparatus according to claim 1 wherein said switching device comprises a monostable multivibrator and said temperature sensitive means comprises a thermistor.

3. The apparatus according to claim 2 including a transducer housing mounted on said vessel below the water line thereof, said transducer means including said thermistor being imperviously sealed within the same said transducer housing.

4. The apparatus according to claim 2 wherein said RC circuit further includes a spread resistor in parallel with said thermistor and a lower limit resistor in series with said thermistor for calibrating the said apparatus for temperature measurement.

* * * * *